S. BIWOIN.
BREAD SLICING MACHINE.
APPLICATION FILED OCT. 13, 1919.
1,336,726.
Patented Apr. 13, 1920.
2 SHEETS—SHEET 1.
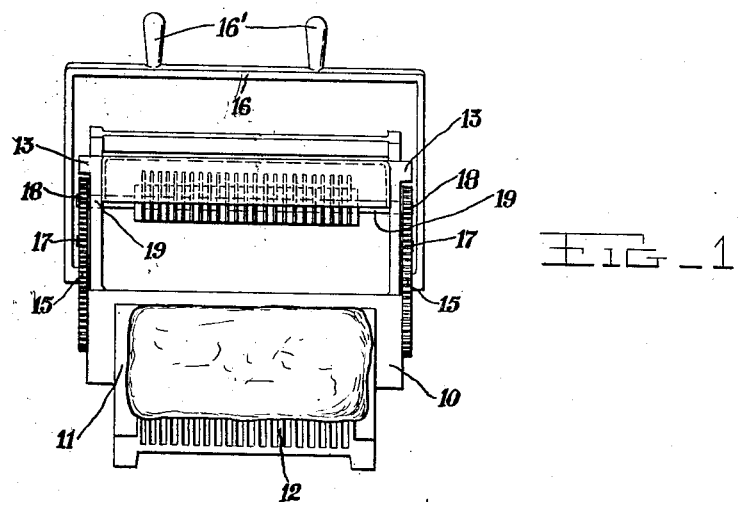
Fig. 1
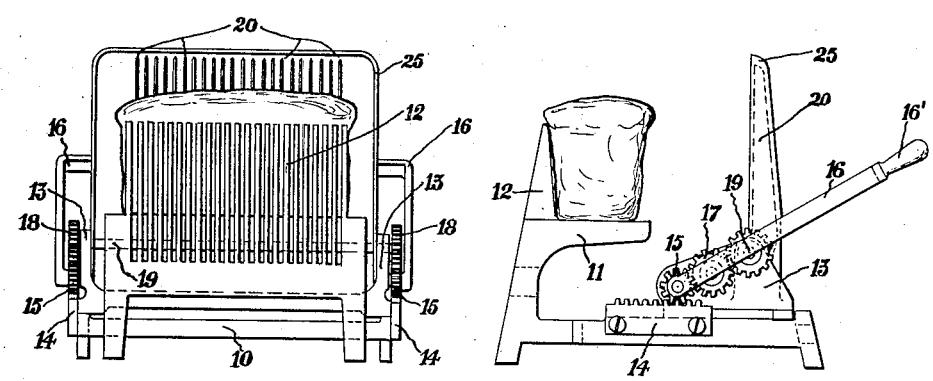
Fig. 2
Fig. 3
INVENTOR.
Stanley Biwoin
BY
ATTORNEY.

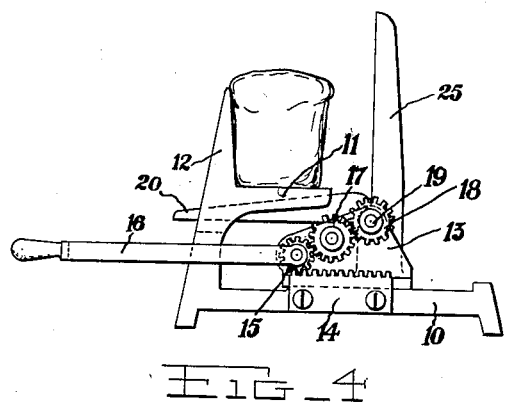
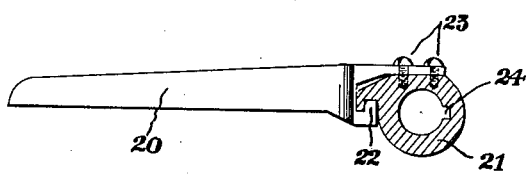
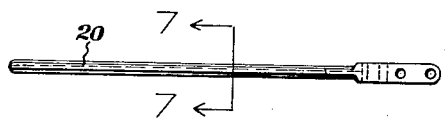
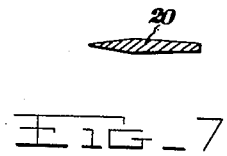

UNITED STATES PATENT OFFICE.

STANLEY BIWOIN, OF WHITE LAKE, WISCONSIN.

BREAD-SLICING MACHINE.

1,336,726.    Specification of Letters Patent.    Patented Apr. 13, 1920.

Application filed October 13, 1919. Serial No. 330,237.

*To all whom it may concern:*

Be it known that I, STANLEY BIWOIN, a citizen of Russia, residing at White Lake, county of Langlade, and State of Wisconsin, have invented certain new and useful Improvements in Bread-Slicing Machines, of which the following is a specification.

The principal object of this invention is to produce a device that will be of exceptional lightness, strength and rigidity, the same being of neat appearance and can be produced at a low cost.

Another object is to provide means by which a plurality of knives may be given a downward, angular shearing movement, cutting an entire loaf into uniform slices by the operation of a single lever.

These objects are attained by the novel construction and combination of parts hereinafter described and shown in the accompanying drawings, forming a material part of this disclosure, and in which—

Figure 1 is a top plan view showing a bread slicing machine made in accordance with the invention.

Fig. 2 is a front elevational view thereof.

Fig. 3 is an end elevational view showing the slicer in normal position.

Fig. 4 is an elevational view showing the position of the knives at the end of the cutting stroke.

Fig. 5 is a side elevational view of the knife spacing collar.

Fig. 6 is a top plan view of the slicing knife, and,

Fig. 7 is a sectional view taken along line 7—7 of Fig. 6.

Referring to the drawings in detail, the numeral 10 designates a frame or stand having a level shelf 11 and back element 12 integral with the frame and slotted or divided vertically, forming guides for the descending knives.

A frame 13 is slidable along parallel guides secured to each side of the main frame 10; also secured to the sides of the frame are the toothed racks 14, in mesh with the gears 15 fixed to the U shaped operating lever 16, pivoted to the ends of the frame 13 and having operating handles 16', by which it is actuated. Intermediate gears 17 are rotatably secured to the frame 13, in mesh with the gears 15, and also with the gears 18, secured to the ends of a keyed shaft 19, journaled within bearings provided in the ends of the frame 13.

The knives 20, secured to collars 21 by the hook elements 22 and the screws 23, are held rigidly upon the shaft 19 by the key way 24, the collars 21 being of proper thickness to compel alinement of the knives with the slots in the frame elements 11 and 12. A frame or knife guard 25 is secured to the sliding frame 13, protecting the knives when in a vertical position.

In operation, a loaf of bread is supported on the shelf against the back and is completely sliced along its entire length by the series of knives acting together in a downward angular direction by means of the gear train and rack when actuated by the hand lever. The knives are guided in their path by a series of slots passing completely through the shelf and back support of the device, and the cutting is performed in an easy and expeditious manner.

Having thus described my invention what I claim as new and desire to secure by Letters Patent, is—

1. In a bread cutter, the combination with a frame and a slotted support for the bread, of a slide movable on said frame, a shaft mounted in said slide, a plurality of knives fixed on said shaft, and a hand lever operatively engaged with said shaft, whereby said slide is moved toward said support and said knives rotated upon the axis of said shaft from a vertical to a horizontal position.

2. In a bread cutter, the combination with a frame and a slotted support for the bread, of a slide movable on said frame, a shaft mounted on said slide, a plurality of knives fixed on said shaft, a rack secured on each side of said frame, a pair of gear trains engaging said racks and said shaft, a lever for actuating said gear trains whereby said slide is advanced, a fixed guard for said knives, and means for guiding said knives as they are advanced and moved downward through said support.

3. In a bread cutter, the combination with a frame and a slotted support for the bread, of a slide movable on said frame, a shaft mounted in said slide, a plurality of knives fixed on said shaft, a rack secured on each side of said frame, pinions engaging said racks, a lever on which said pinions are mounted, gears on said shaft, intermediate gears between said pinions and said first named gears, and handles attached to said lever whereby said knives may be caused to pass through said slotted supports severing the bread thereon.

In testimony whereof I have affixed my signature.

STANLEY BIWOIN.